(12) United States Patent
Huang et al.

(10) Patent No.: US 10,120,842 B2
(45) Date of Patent: *Nov. 6, 2018

(54) FONT PRELOADING

(71) Applicant: Apple Inc., Cupertino, CA (US)

(72) Inventors: Szu-Wen Huang, Fremont, CA (US); Valeri A. Krasnov, San Ramon, CA (US); Jesse W. Boettcher, San Jose, CA (US)

(73) Assignee: Apple Inc., Cupertino, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 15/048,950

(22) Filed: Feb. 19, 2016

(65) Prior Publication Data

US 2016/0246764 A1    Aug. 25, 2016

Related U.S. Application Data

(63) Continuation of application No. 11/899,034, filed on Sep. 4, 2007, now Pat. No. 9,269,332.

(51) Int. Cl.
| | | |
|---|---|---|
| *G06F 17/00* | (2006.01) | |
| *G06F 17/21* | (2006.01) | |
| *G06F 17/22* | (2006.01) | |
| *G06F 17/30* | (2006.01) | |
| *G09G 5/24* | (2006.01) | |
| *G06K 15/02* | (2006.01) | |
| *G06F 17/24* | (2006.01) | |
| *G06F 11/07* | (2006.01) | |

(52) U.S. Cl.
CPC ........ *G06F 17/214* (2013.01); *G06F 17/2217* (2013.01); *G06F 17/30147* (2013.01); *G09G 5/24* (2013.01); *G06F 11/0742* (2013.01); *G06F 17/211* (2013.01); *G06F 17/24* (2013.01); *G06K 15/02* (2013.01)

(58) Field of Classification Search
CPC .. G06F 17/214; G06F 17/211; G06F 17/2217; G06F 17/24; G06K 15/02; G06T 11/203; G09G 5/24; G09G 5/222
See application file for complete search history.

(56) References Cited

U.S. PATENT DOCUMENTS

| | | |
|---|---|---|
| 5,155,805 A | 10/1992 | Kaasila |
| 5,325,479 A | 6/1994 | Kaasila |
| 5,379,057 A | 1/1995 | Clough et al. |
| 5,416,898 A | 5/1995 | Opstad et al. |
| 5,675,362 A | 10/1997 | Clough et al. |
| 5,675,718 A | 10/1997 | Miller |
| 5,715,473 A | 2/1998 | Reed |
| 5,877,776 A | 3/1999 | Beaman et al. |
| 5,920,880 A | 7/1999 | Dowdy et al. |
| 5,926,189 A | 7/1999 | Beaman et al. |

(Continued)

*Primary Examiner* — Quoc A Tran
(74) *Attorney, Agent, or Firm* — Dickinson Wright RLLP

(57) ABSTRACT

There is provided a method for preloading the glyphs required to display the content of a system. In accordance with an embodiment of the present technique, only those glyphs which are present in the system upon startup or synchronization of an electronic device are preloaded. The glyphs present upon startup or synchronization of the electronic device may be determined by scanning the system. In an illustrated embodiment, scanning the system may include analyzing models and views to determine the glyphs present in the system.

26 Claims, 2 Drawing Sheets

(56) References Cited

U.S. PATENT DOCUMENTS

| | | |
|---|---|---|
| 5,940,581 A * | 8/1999 | Lipton .................. G06F 17/214 358/1.11 |
| 6,021,218 A | 2/2000 | Capps et al. |
| 6,073,147 A | 6/2000 | Chan et al. |
| 6,091,505 A | 7/2000 | Beaman et al. |
| 6,204,782 B1 | 3/2001 | Gonzalez et al. |
| 6,323,865 B1 | 11/2001 | Colletti |
| 6,356,268 B1 | 3/2002 | Beaman et al. |
| 6,369,902 B1 | 4/2002 | Beaman et al. |
| 6,480,291 B1 | 11/2002 | Daniels et al. |
| 6,714,199 B1 | 3/2004 | Beaman et al. |
| 6,727,997 B1 | 4/2004 | Miller |
| 6,751,726 B1 | 6/2004 | Dresevic et al. |
| 6,762,770 B1 | 7/2004 | Opstad et al. |
| 6,897,870 B1 | 5/2005 | Clegg |
| 6,975,412 B2 | 12/2005 | Daniels et al. |
| 7,064,757 B1 | 6/2006 | Opstad et al. |
| 7,117,450 B1 | 10/2006 | Chaudhri |
| 7,155,672 B1 | 12/2006 | Adler et al. |
| 7,184,056 B2 | 2/2007 | Brody et al. |
| 7,379,075 B2 | 5/2008 | Opstad et al. |
| 7,433,546 B2 | 10/2008 | Marriott et al. |
| 7,937,658 B1 | 5/2011 | Lunde |
| 2003/0115240 A1 | 6/2003 | Cho |
| 2003/0220984 A1 | 11/2003 | Jones et al. |
| 2004/0246254 A1 | 12/2004 | Opstad et al. |
| 2006/0088228 A1 | 4/2006 | Marriott et al. |
| 2006/0100978 A1 | 5/2006 | Heller et al. |
| 2006/0129632 A1 | 6/2006 | Blume et al. |
| 2006/0155527 A1 | 7/2006 | Choi |
| 2006/0170684 A1 | 8/2006 | Kobayashi et al. |
| 2006/0232588 A1 | 10/2006 | Opstad et al. |
| 2006/0265637 A1 | 11/2006 | Marriott et al. |
| 2007/0024626 A1 * | 2/2007 | Kagle .................. G06F 17/214 345/467 |
| 2007/0217716 A1 | 9/2007 | Marriott et al. |
| 2008/0024806 A1 | 1/2008 | Bacus et al. |
| 2008/0065988 A1 | 3/2008 | Gupta et al. |
| 2008/0238927 A1 | 10/2008 | Mansfield |
| 2009/0033689 A1 | 2/2009 | Avkarogullari et al. |
| 2009/0100074 A1 * | 4/2009 | Joung .................. G06F 17/214 |

* cited by examiner

FONT PRELOADING

CROSS REFERENCE TO RELATED APPLICATIONS

This application is a continuation of U.S. application Ser. No. 11/899,034, filed Sep. 4, 2007, now U.S. Pat. No. 9,269,332, issued Feb. 23, 2016, which is incorporated by reference herein in its entirety.

BACKGROUND OF THE INVENTION

1. Field of the Invention

The present invention relates generally to electronic devices and, more particularly, to loading font glyphs for use on an electronic device.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

An electronic device having a user interface, such as a display, may be able to present information to a user in a number of formats. For example, a portable music player may be able to operate in several user-selectable languages, such as English, French, Spanish, Arabic, Chinese, etc. Accordingly, in order to enable a user to select an interface language, the electronic device may include characters for numerous different languages. Depending on the number of languages available on the electronic device, the number of characters required to be stored may be extensive. In addition, a single language may be available in a variety of fonts, typefaces, sizes, and styles.

Each character in a language or font may be represented by a different glyph. Additionally, based on the type of font being used, different sizes and styles of a character in a given font may be represented by different glyphs. For example, bitmap fonts consist of a separate glyph for each typeface character and size, whereas outline fonts consist of a single glyph for each typeface character which can be resized based on the font size. Accordingly, an electronic device may include a very large number of glyphs representing various letters, numbers, and other symbols in different languages and fonts. The glyphs may be stored, for example, on a hard drive or on a type of non-volatile read-only memory (ROM).

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

Accordingly, there is provided a process for loading glyphs, including scanning an electronic device to determine the glyphs present in the device upon startup or synchronization and copying only those glyphs to a system memory. Scanning the device may include analyzing views to determine possible character attributes, such as, for example, font, typeface, size, style, and color. In addition, models may be analyzed to determine the characters present in the device and the view with which each character is associated. The combination of character and attribute may define a required glyph, and a list of required glyphs may be compiled based on the views and models. The listed glyphs may then be copied from a non-volatile storage device to the system memory.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

Figure 1:
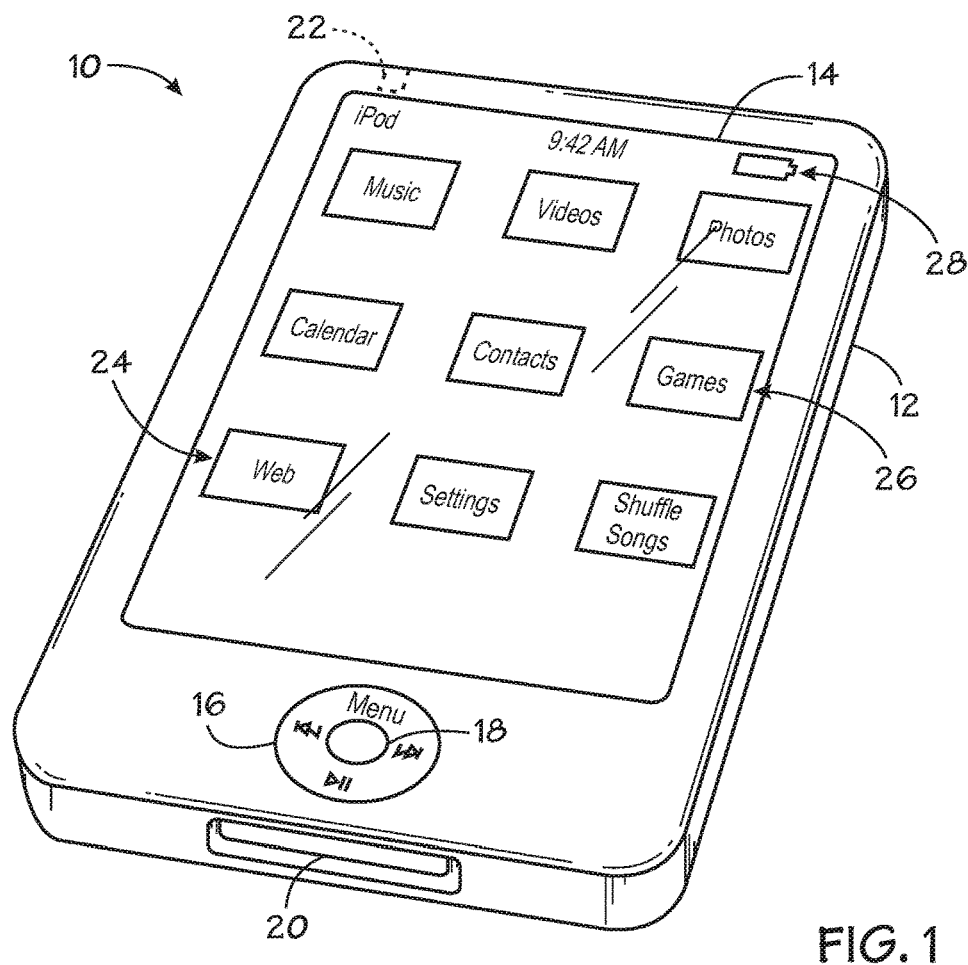
FIG. 1 is a perspective view of a portable electronic device in accordance with an one example of an embodiment of the present invention.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In order for the electronic device to display the glyphs on demand, they are first loaded into a system memory, such as random access memory (RAM), from the storage drive. From the RAM, the glyphs can be quickly displayed when required. That is, when a display changes, the glyphs required for the new display may be rendered quickly from the RAM. In a device with a large number of glyphs and/or a small RAM, it may not be desirable to load all of the available glyphs onto the RAM upon startup of the device, as this may waste valuable memory. However, it may also be undesirable to load glyphs from the storage device onto the RAM upon demand, as this may be unacceptably slow. This problem is of particular concern for small portable devices, which are typically battery-powered, and which have very limited memory resources.

An electronic device may render glyphs on a display according to a model-view-controller (MVC) design pattern. In the MVC design, a model contains information such as data. In the case of rendering glyphs, the model may include the characters and symbols to display. A view contains information about how to display the data. For example, the view may contain the font, size, and style in which characters and symbols in the model are to be rendered. The font may include a specific typeface, such as, for example, Myriad, Chicago, Espy, etc. The size may be expressed as a point size or as a relative size to be interpreted by the controller. For example, a font size may be 8 points, 12 points, 36 points, etc. In some cases, the font size may be designated as "small", "medium", "large", etc. The style may include additional characteristics, such as italics, underline, strikethrough, etc. Furthermore, the view may contain information on the font color if different from a default color. Finally, a controller combines the model and the view to render a finished product. For example, the controller conveys the information about how to display the data from the view to the data in the model such that the data is displayed properly. On a given screen, the controller may combine several different models and views to produce the finished product.

FIG. 1 illustrates an electronic device 10 employing an MVC design pattern. In the illustrated embodiment, the electronic device 10 may be a portable music player, such as any iPod model having a display screen or any iPhone model available from Apple Inc. However, the presently disclosed techniques may be applicable to a variety of other electronic devices, such as, for example, a desktop computer, a portable computer, a cellular telephone, or any other processor-based device. In the illustrated example, the electronic device 10 generally includes a casing 12, a display 14, and a user input interface 16. The user input interface 16 may be integral with the screen 14, such as a touch screen, or may be a separate device, such as a touch-sensitive circular interface. In addition, a power button 18 may be a separate from or integral with the user input interface 16. The electronic device 10 may further include an input/output port 20, such as a serial bus interface, and an audio output port 22, such as a headphone jack.

The display 14 may show many different screens containing a variety of information. As one example, the display 14 may show a screen 24 including a menu 26 of user-selectable applications or content and a system bar 28. The screen 24 may include different views for the menu 26 and the system bar 28. For example, the menu 26 may be displayed with a font size of 12 points, whereas the system bar 28 may have a font size of 8 points. In order for the menu 26 and the system bar 28 to be displayed, the glyphs present in each item are loaded into a system memory then rendered on the display 14. In the illustrated embodiment, the characters present in the model include: "E", "M", "P", "S", "a", "c", "d", "e", "f", "g", "h", "i", "l", "n", "o", "r", "s", "t", "u", "x", and ">". The controller may interpret the information from the model and the view to determine that the glyphs required to render the displayed screen include: "E", "M", "P", "S", "a", "c", "e", "f", "g", "h", "i", "l", "n", "o", "r", "s", "t", "u", "x", and ">" in 12 point font, and "P", "d", "i", and "o" in 8 point font. The screen 24 may then be rendered and displayed on the display 14.

Figure 2:
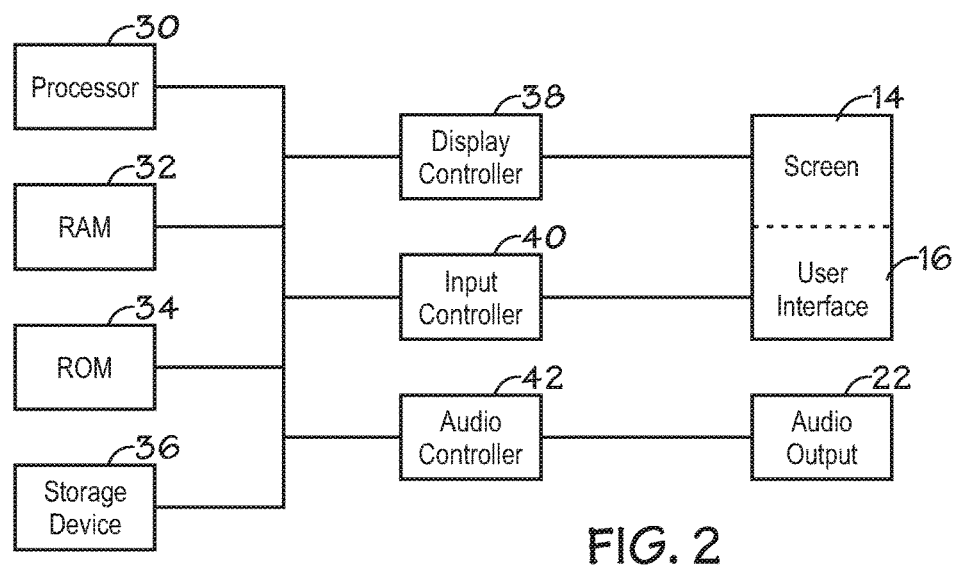
FIG. 2 is a diagrammatical view of components of the portable electronic device of FIG. 1 in accordance with one example of an embodiment of the present invention.

Turning to FIG. 2, a block diagram of components of the electronic device 10 is illustrated. The electronic device 10 may include, for example, a processor 30, a random access memory (RAM) 32, a read-only memory (ROM) 34, and a non-volatile storage device 36. The non-volatile storage device 36 may include, for example, a type of read-only memory (such as ROM, EPROM, EEPROM), a hard drive, a flash memory, a tape drive, a disc drive, etc. The non-volatile storage device 36 may be used to store content, such as music, photos, contacts, calendars, etc., and may also be used to store the models, views, and glyphs for display on the display 14 (FIG. 1). The non-volatile storage device 36 may also include controller applications to display the screen 24, as well as other applications to enable functionality for a display controller 38, an input controller 40, an audio controller 42, etc. The controllers 38, 40, and 42 may control the components of the device 10. For example, the display controller 38 may be coupled to and control the display 14. Likewise, the input controller 40 may control the user input interface 16, and the audio controller 42 may control the audio output port 22. The processor 30 may load information from the ROM 34 and/or the non-volatile storage device 36 to the RAM 32 for use during operation of the electronic device 10.

Figure 3:
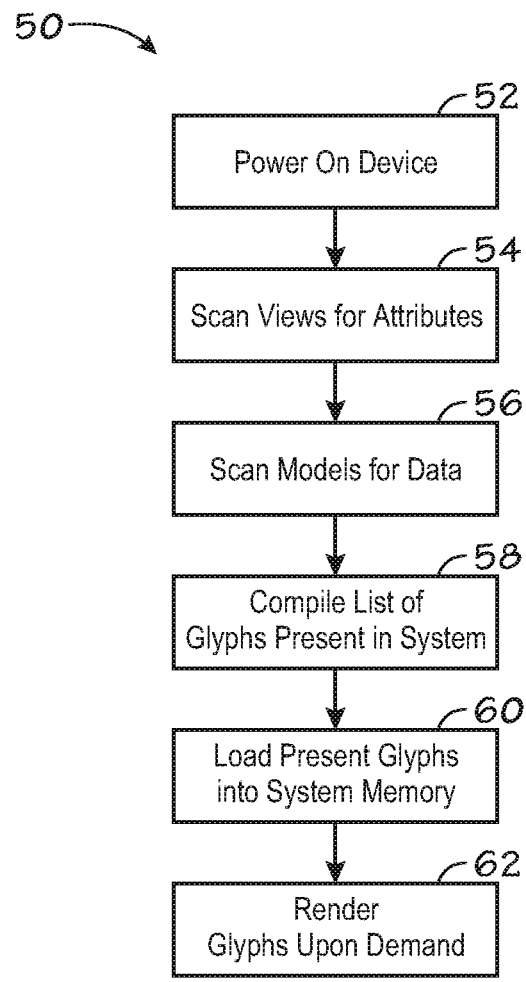
FIG. 3 is a flow chart of a method for loading glyphs present in the system in accordance with one example of an embodiment of the present invention.

FIG. 3 illustrates a process 50 for loading the glyphs into the RAM 32 of FIG. 2. Upon powering on the device 10 or after a "sync" operation (Block 52), for example, the views in a system may be analyzed to determine possible attributes of required glyphs (Block 54). The attributes may include, for example, font, size, style, color, etc. Different views may include a menu view, a song title view, a photo title view, a contact name view, etc. Any data which may be displayed on the device 10 may be associated with a view, such that all of the data may be rendered properly for display. Also, there may be a default view for data that is not properly associated with a specific view.

The models in the system may be scanned to determine what data may be displayed during use of the system (Block 56). For example, the electronic device 10 may include song files, such as MP3 or AAC files. Each song file may contain information about the song, including a title, performer, genre, length, etc. The models include information on which view should be used to display the data. The characters and their attributes required to display the information contained in the system may then be compiled into a list based on the information gathered from the views and models (Block 58). That is, for each view, a list may be compiled of the characters from the models using that view. The combinations of characters from the models and attributes from the views determine the glyphs present in the system. For example, in the case of a bitmap typeface, each size of a given character is a separate glyph. In an outline typeface, each character is a different glyph that can be resized based on the size called for in the view. To facilitate faster display of glyphs, the outline fonts may be pre-rendered based on the compiled list to produce bitmaps ready for display. It should be noted that scanning of the views and models may be reversed, and compilation of the list of glyphs may be organized accordingly.

The glyphs present in the system upon powering on the device 10 or after a "sync" operation may then be loaded from the ROM 34 or the non-volatile memory 36 into the RAM 32 (Block 60) so that the glyphs may be rendered upon demand (Block 62). In an exemplary embodiment, bitmaps of the required glyphs may be loaded into the RAM 32 for quick display. The loaded bitmaps may be characters from bitmap typefaces or may be pre-rendered characters from outline typefaces. By preloading only those glyphs which are actually present in the system, the amount of RAM 32 needed for storing glyphs may be conserved while ensuring that screens will be rendered and displayed quickly without waiting for a glyph to be loaded into the RAM 32 from another storage device.

In addition, some pre-determined glyphs that are commonly used may be loaded regardless of their presence in the system scan. For example, a very popular set of glyphs with small memory constraints may be automatically preloaded. Additionally, rather than preloading all of the glyphs present, glyphs that appear or that are used infrequently may not be preloaded but rather may be loaded upon demand. That is, a glyph that is present in a limited number of models on the system or that appears only in infrequently used models may not be preloaded because it is less likely than more common glyphs to actually be required for display. By analyzing the frequency that the glyph appears in the system or the frequency that glyphs have been used previously, loading times may be shortened.

Furthermore, an external manager program may assist in compiling the list of glyphs present in the system. For example, in the previous example where music files are scanned to determine glyphs required to display song information, a music player, such as iTunes available from Apple Inc., may be utilized to keep track of the glyphs present in the music files. This technique may shorten the time required to scan the system upon startup or after a "sync" operation. The external manager program may supply a list of glyphs needed to display the information managed, or may provide a general class of characters needed. For example, if a limited number of views are utilized in the system, it may be adequate to designate the required characters as all English characters. In this way, the scan operation may be omitted and the entire set of English glyphs may be pre-loaded.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A portable electronic device, comprising:
   at least one non-volatile memory device storing at least one symbol that is capable of being presented at a display of the portable electronic device;
   at least one processor configured to, during a startup of the portable electronic device:
   i) analyze one or more views that are to be presented at the display, wherein the one or more views include at least one attribute for determining a manner in which the at least one symbol is to be presented in the one or more views at the display,
   ii) generate, based on the at least one attribute and the at least one symbol, a list of glyphs; and
   iii) preload, from the at least one non-volatile memory device, at least one glyph from the list of glyphs into a volatile memory device of the portable electronic device.

2. The portable electronic device of claim 1, wherein the at least one non-volatile memory device stores the at least one symbol and the one or more views.

3. The portable electronic device of claim 1, wherein the at least one attribute includes a font, a size, a style, or a color.

4. The portable electronic device of claim 1, wherein, subsequent to the startup of the portable electronic device, the one or more views are presented at the display.

5. The portable electronic device of claim 4, wherein the one or more views include a menu view, a system bar, a photo title view, a contact name view, or a song title view.

6. The portable electronic device of claim 1, wherein the at least one symbol includes data, and the portable electronic device utilizes the data to select a specific view from the one or more views.

7. The portable electronic device of claim 1, wherein the least one glyph is generated from only the list of glyphs.

8. A method performed by a portable electronic device comprising at least one non-volatile memory device storing at least one symbol capable of being presented at a display of the portable electronic device, the method comprising:
   i) during a startup of the portable electronic device:
      a) scanning for one or more views that are to be presented at the display, wherein the one or more views include at least one attribute for determining a manner in which the at least one symbol is to be presented in the one or more views at the display,
      b) generating, based on the at least one attribute and the at least one symbol, a list of glyphs, and
      c) pre-loading, from the at least one non-volatile memory device, at least one glyph from the list of glyphs into at least one volatile memory device of the portable electronic device; and
   ii) reading the at least one glyph.

9. The method of claim 8, further comprising:
   presenting the at least one glyph at the display.

10. The method of claim 8, wherein:
    i) the at least one glyph is associated with an outline font,
    ii) the outline font comprises a single glyph for a first typeface character in the outline font, and
    iii) the single glyph is resized based on a font size.

11. The method of claim 8, wherein the least one glyph is generated from only the list of glyphs.

12. The method of claim 8, wherein the list of glyphs does not include every glyph that is stored in the at least one non-volatile memory device.

13. The method of claim 8, wherein the at least one attribute includes a font, a size, a style, or a color.

14. The method of claim 8, wherein, subsequent to the startup of the portable electronic device, the one or more views are presented at the display.

15. The method of claim 8, wherein, subsequent to the startup of the portable electronic device, the method further comprises:
    pre-loading another glyph from the list of glyphs into the at least one volatile memory device, wherein the another glyph is distinct from the at least one glyph.

16. The method of claim 15, further comprising:
    displaying the another glyph at the display.

17. The method of claim 8, wherein the one or more views include a menu view, a system bar, a photo title view, a contact name view, or a song title view.

18. The method of claim 8, wherein the at least one symbol is associated with a language.

19. The method of claim 18, wherein the language is associated with at least one of English, French, Spanish, Arabic, or Chinese.

20. At least one non-transitory computer readable storage medium containing instructions, that in response to being executed by at least one processor of a portable electronic device, cause the portable electronic device to:
    during a startup of the portable electronic device, wherein the portable electronic device comprises at least one non-volatile memory device storing at least one symbol that is capable of being presented at a display of the portable electronic device:
    a) scan for one or more views that are to be presented at the display, wherein the one or more views include at least one attribute for determining a manner in which the at least one symbol is to be presented in the one or more views at the display, b) generate, based on the at least one attribute and the at least one symbol, a list of glyphs, and c) preload, from the at least one non-volatile memory device, at least one glyph from the list of glyphs into at least one volatile memory device of the portable electronic device.

21. A portable electronic device, comprising:

at least one non-volatile memory device storing at least one symbol that is capable of being presented at a display of the portable electronic device;

at least one volatile memory device; and at least one processor coupled to the at least one non-volatile memory device and the at least one volatile memory device, wherein the at least one processor is configured to, during a startup of the portable electronic device:

a) scan for one or more views that are to be presented at the display, wherein the one or more views include at least one attribute for determining a manner in which the at least one symbol is to be presented in the one or more views at the display, and b) generate, from the at least one attribute and the at least one symbol, a list of glyphs.

22. The portable electronic device of claim 21, wherein the at least one volatile memory device further causes the portable electronic device to:

preload, from the at least one non-volatile memory device, at least one glyph from the list of glyphs.

23. The portable electronic device of claim 21, wherein the at least one non-volatile memory device stores the one or more views.

24. The portable electronic device of claim 22, wherein the at least one attribute includes a font, a size, a style, or a color.

25. The portable electronic device of claim 22, wherein, subsequent to the startup of the portable electronic device, the one or more views are presented at the display.

26. The portable electronic device of claim 22, wherein the at least one symbol includes data, and the portable electronic device utilizes the data to select a specific view from the one or more views.

* * * * *